(No Model.)
J. S. DICKSON.
THE MANUFACTURE OF NAILS.
No. 332,190. Patented Dec. 8, 1885.
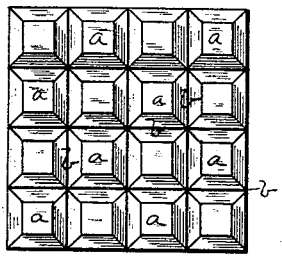
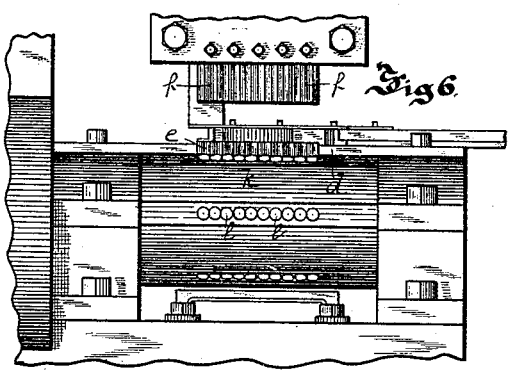
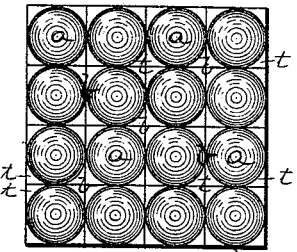
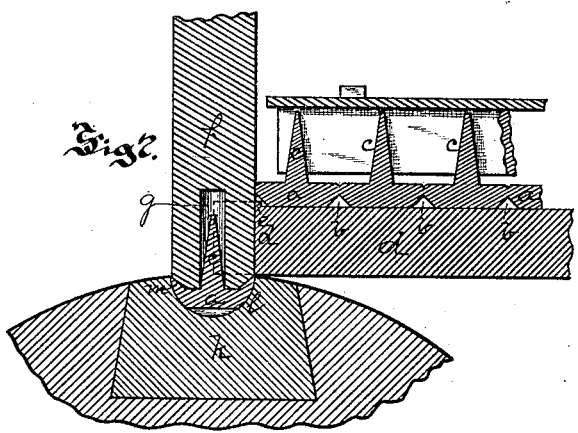
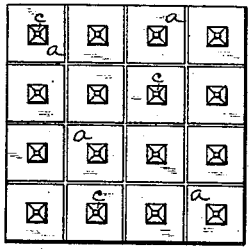
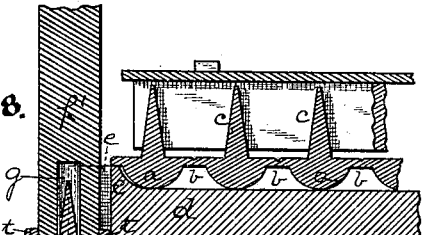
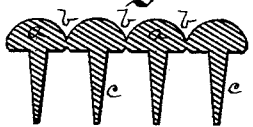
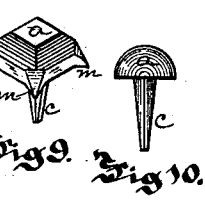
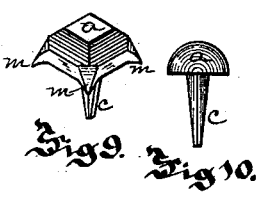
Witnesses.
J. W. Cooke.
John Cobbitt
Inventor.
John S. Dickson
By James F. Ray
Attorney

UNITED STATES PATENT OFFICE.

JOHN S. DICKSON, OF PITTSBURG, ASSIGNOR TO THE PITTSBURGH HOB NAIL MANUFACTURING COMPANY, OF BRIDGEWATER, PA.

MANUFACTURE OF NAILS.

SPECIFICATION forming part of Letters Patent No. 332,190, dated December 8, 1885.

Application filed August 12, 1885. Serial No. 174,173. (No specimens.)

*To all whom it may concern:*

Be it known that I, JOHN S. DICKSON, of Pittsburg, in the county of Allegheny and State of Pennsylvania, have invented a new and useful Improvement in the Manufacture of Nails; and I do hereby declare the following to be a full, clear, and exact description thereof.

My invention relates to the manufacture of nails, its object being to form a cast nail or brad having a heavy head suitable for hob-nails, upholsterers' nails, carriage-nails, &c.

Heretofore hob-nails have been formed by casting a frangible sheet of nails the heads of which are united at their edges and the tangs or shanks of which extend up from one face thereof, as shown and described in Letters Patent No. 288,958, granted to W. W. Titzell, November 20, 1883, the sheet of nails so cast being subsequently separated from each other and then decarburized or malleableized to render them tough and ductile. In the manufacture of hob-nails and nails for other purposes, however, it is found desirable to provide the under face of the nail-head with projecting points to prevent the turning of the nail when driven to place, as well as to compress the head of the nail during its manufacture to form it to shape according to the use for which it is intended. This could not be accomplished in making the nail according to the method described in said patent, except by feeding each separate nail after annealing to a forging machine or press, this being expensive and requiring complicated machinery. By my invention these objections are entirely overcome. This I accomplish by casting the nails so that the heads form a sheet, then decarburizing the sheets of nails, and finally separating the nails from the sheets and finishing the heads by bending, pressing, or forging them to the required shape and removing any waste, the separate feeding of the nails being thus overcome and their manufacture greatly facilitated and cheapened.

To enable others skilled in the art to practice my invention, I will describe the same more fully, referring to the accompanying drawings, in which—

Figures 1 and 2 are views of the upper face of different forms of nails cast together and united along the edges of the nails. Fig. 3 is a view of the under surface of such sheet. Figs. 4 and 5 are cross-sections of such sheets. Figs. 6, 7, and 8 are views illustrating the separation of the nails from the sheets and their formation into the finished product, and Figs. 9 and 10 are views of the finished nails.

Like letters of reference indicate like parts in each.

In carrying on my improved method of forming these nails the mold for the nail-sheet is formed in the usual manner, the pattern used being a counterpart of the nail-sheet, and after the formation of the mold the molten iron run in, and when cool and set the flask is opened and the sheet of nails removed. This sheet may be of any desired shape and size, those illustrated being a sheet of hob-nails and of upholsterers' nails having the heads *a* united at their edges along the grooves or depressions *b*, and provided on the under surfaces with the shanks *c*. The shape of the heads and sheets may of course vary according to the purpose intended. After the casting of the nail-sheet it is packed in a suitable box and surrounded with iron scales, iron ore, or other carbon-absorbing material, and placed within an annealing-furnace and raised to the necessary heat to decarburize or malleableize it, so rendering it soft and tough. The decarburized or malleableized sheet of nails is then ready to be formed into finished nails. This I accomplish by separating the nails from the sheets by suitable machinery, which is fully described in a separate application for patent of even date herewith, Serial No. 174,172, by means of which the nails can be rapidly severed from the plate and bent or pressed to shape.

In the accompanying drawings I have illustrated dies suitable for the purpose in order that my improved method of manufacture may be fully understood. The nail-sheet, resting on the heads *a*, is fed over a suitable shearing edge or knife, *d*, having cutting or breaking edges *e* at right angles to each other, a series of these cutting-edges being formed on the knife, so that a series of the nails may be separated from the sheet at each downstroke of the punching apparatus. This punching apparatus is formed of a series of punches, f, secured within a reciprocating punch-slide, each punch having a central opening, g, to receive the shanks c of the nail, the punch thus fitting around the shank and shearing or breaking the nail from the nail-sheet supported on the stationary knife, the knife having a supporting-lip fitting into the depression b of the sheet. Below the knife d is the anvil k, upon or within which the nail-head is bent or pressed to shape, the anvil having preferably the form of an intermittently-rotating shaft mounted in suitable bearings and acting to carry the nail away after the retraction of the punch. The anvil has suitable seats, l, within which the nail-heads are bent or pressed to shape.

When it is intended to form hob-nails as shown on Figs. 1, 4, and 9, the end of the punch is smaller than the diameter of the nail-head between its diagonal corners, and it presses the body of the nail into the seat l, the walls of the seat bending up the corners, and so forming the prongs m on the lower edge of the nail-head.

After the casting and annealing of the nail-sheet it is fed to the machine for the purpose of separating the nails and finishing their heads, being fed diagonally to the line of punches and shears, and the nails are first severed from the sheet and then carried by the punches into the seats and the heads pressed or bent to shape. The finished nails remain in the seats, and are carried by the intermittently-rotating anvil away from the punches, another set of seats being brought under them to receive the nails on the next downstroke thereof. The sheets are generally cast in rows of ten or more, so that the nails are rapidly finished. Where nails have circular heads, or heads of other form than square, as shown in Figs. 2, 5, and 10, the surplus metal may be sheared off between the punch and the upper edge of the seat or recess. This is illustrated in Fig. 8, in which the lower end of the punch $f'$ is circular and corresponds in diameter to the seat $l'$, the nail being first severed from the nail-sheet and then carried by the punch $f'$ into the seat $l'$, and the corners or waste edges $t$ of the nail-head sheared off, while the punch on its further advance compresses the nail-head to the desired shape within the sheet.

The nails so formed can be rapidly and cheaply made, and are soft and tough, so that they can be employed for any purpose for which like wrought-metal nails are used.

What I claim as my invention, and desire to secure by Letters Patent, is—

1. The herein-described process of making nails, consisting in casting the nails so that the heads form a sheet, in decarburizing the sheet of nails, and in separating the nails from the decarburized sheet, substantially as specified.

2. The herein-described process of making nails, consisting in casting the nails so that their heads form a sheet, in decarburizing the sheet of nails, in separating the nails from the decarburized sheet, and in finishing the nail-heads, substantially as specified.

3. As steps in the method of making nails, separating the nails from a sheet formed by the heads of the nails, shearing any waste from the heads, and finally compressing the heads, substantially as and for the purposes set forth.

In testimony whereof I, the said JOHN S. DICKSON, have hereunto set my hand.

JOHN S. DICKSON.

Witnesses:
A. M. IRWIN,
JAMES I. KAY.